(12) United States Patent
Yang

(10) Patent No.: US 12,478,516 B2
(45) Date of Patent: Nov. 25, 2025

(54) SUPER-SOFT CREEP-RESISTANT ELASTIC NON-WOVEN FABRIC

(71) Applicant: ROYAL (FUJIAN) INDUSTRIAL CO., LTD., Fujian (CN)

(72) Inventor: Qiugen Yang, Xiamen (CN)

(73) Assignee: ROYAL (FUJIAN) INDUSTRIAL CO., LTD., Xiamen (CN)

( * ) Notice: Subject to any disclaimer, the term of this patent is extended or adjusted under 35 U.S.C. 154(b) by 462 days.

(21) Appl. No.: 18/094,319

(22) Filed: Jan. 6, 2023

(65) Prior Publication Data

US 2024/0065899 A1  Feb. 29, 2024

(30) Foreign Application Priority Data

Aug. 26, 2022 (CN) .......................... 202211034289.X

(51) Int. Cl.
 A61F 13/49 (2006.01)
 C08K 3/04 (2006.01)
 C08L 51/08 (2006.01)

(52) U.S. Cl.
 CPC .......... *A61F 13/4902* (2013.01); *C08K 3/042* (2017.05); *C08L 51/08* (2013.01)

(58) Field of Classification Search
 CPC .......... A61F 13/4902; A61F 13/15593; C08K 3/042; C09J 153/02; C09J 153/025; C09J 11/04; C09J 157/02; C09J 193/04; C08L 51/08; B32B 5/02; B32B 3/28; B32B 5/022; B32B 5/26; B32B 7/12; B32B 29/002; B32B 29/02; B32B 37/1207; B32B 2037/1215; B32B 2262/0261; B32B 2262/0276; B32B 2262/0292; B32B 2307/51
 USPC ...................... 442/329; 428/221; 264/172.11
 See application file for complete search history.

(56) References Cited

U.S. PATENT DOCUMENTS

2004/0219854 A1* 11/2004 Groitzsch ........... A61F 13/4902
 442/352
2006/0270302 A1* 11/2006 Ando ................ B29C 66/81431
 442/381

FOREIGN PATENT DOCUMENTS

CN 113017991 A 6/2021

* cited by examiner

*Primary Examiner* — Matthew D Matzek

(57) ABSTRACT

A super-soft elastic composite material includes a substrate layer having a pleated structure, a hot melt adhesive layer, and an elastic layer, wherein the pleated structure consists of crest portions and trough portions connecting the crest portions. A plurality of elastic elements are arranged at intervals on the substrate layer along a breadthwise direction of the substrate layer, and the elastic layer and the substrate layer are combined and bonded through hot melt adhesive layer. The elastic composite material is constructed by combining two layers of structure, the hot melt adhesive layer is coated on a bonding surface of each elastic element facing the substrate layer first, and then the elastic elements are bonded to the trough portions through the hot melt adhesive layer, such that the elastic composite material is stretchable and recoverable in the longitudinal direction.

11 Claims, 2 Drawing Sheets

SUPER-SOFT CREEP-RESISTANT ELASTIC NON-WOVEN FABRIC

CROSS-REFERENCE TO RELATED APPLICATIONS

This application is based upon and claims priority to Chinese Patent Application No. 202211034289.X, filed on 26 Aug. 2022, the entire contents of which are incorporated herein by reference.

TECHNICAL FIELD

The present disclosure relates to the technical field of non-woven fabrics, in particular to a super-soft and creep-resistant elastic non-woven fabric.

BACKGROUND

At present, under the development trend of more comfort, better air permeability and good fit for disposable absorbent products, elastic composite materials such as elastic non-woven fabrics, elastic sheets, elastic films, and so on have been widely used in disposable absorbent products. These elastic materials may be used as elastic waistband of disposable absorbent products or they may also be cut as pull-up diapers.

The currently available elastic composite materials generally have a three-layer composite structure, and the majority of elastic composite materials have spandex filaments as elastic material. Namely, the three-layer composite structure is composed of an upper layer non-woven fabric, a lower layer non-woven fabric, and spandex filaments located therebetween. The spandex filaments are combined with the upper layer non-woven fabric and the lower layer non-woven fabric by means of hot melt adhesive. Further, both the upper layer non-woven fabric and the lower layer non-woven fabric have folds and pleats with a structure extending along the longitudinal direction. For example, China's patent application No. CN113017991A discloses a novel elastic waistband non-woven fabric which, as shown in FIG. 1, includes an upper elastic non-woven fabric 1, a lower elastic non-woven fabric 2, and an elastic element 3 sandwiched therebetween. The upper elastic non-woven fabric 1 is provided with a wave-shaped structure with upper wave crest portions 11 and upper wave trough portions 12 arranged alternately in the thickness direction of the upper elastic non-woven fabric. The lower elastic non-woven fabric 2 is also provided with a wave-shaped structure with lower wave crest portions 21 and lower wave trough portions 22 arranged alternately in the thickness direction of the lower elastic non-woven fabric 2. When the elastic element 3 is in a natural and non-tension state, the elastic element 3 is combined with the upper wave trough portions 12 and the lower wave crest portions 21, and the combination positions of the upper wave trough portions 12 correspond to those of the lower wave crest portions 21. The upper wave crest portions 11 and the lower wave trough portions 22 do not come into contact with the elastic element 3. As mentioned above, since the existing elastic non-woven fabric (elastic material) is constructed by combining three layers of structure, on the one hand, the elastic non-woven fabric is thick which reduces the softness, comfort degree and air permeability of the elastic non-woven fabric, on the other hand, the raw materials consumed in the production is increased which increases the cost. In view of this problem, the present disclosure provides an elastic composite material constructed by combining two layers of structure. For example, an elastic non-woven fabric is composed of a non-woven fabric layer and spandex filaments which are combined through a hot melt adhesive layer. As a result, the non-woven fabric is only configured on one side of the elastic elements, thereby reducing the raw materials consumed in the production and increasing the softness of the elastic non-woven fabric.

In addition, the reason why the existing elastic materials are all constructed by three layers of structure is that in the elastic non-woven fabric (elastic material) with three layers of structure, the upper layer non-woven fabric and the lower layer non-woven fabric not only serve as carriers of the elastic material, but also play the role of anchoring or fixing the spandex filaments (elastic material), thereby avoiding poor creep resistance of the spandex filaments caused due to insufficient anchorage effect when the existing elastic material is in a stretched state, namely, the problem that the spandex filaments retract under stretching due to the insufficient anchoring effect of the hot melt adhesive. Obviously, in the elastic non-woven fabric with two layers of structure, due to the loss of the anchorage for the spandex filaments on the other side, when the elastic non-woven fabric with two layers of structure is in a stretched state, the creep resistant behaviour of the spandex filaments gets worse due to the lack of anchorage for the spandex filaments, namely, the problem that the spandex filaments retract under stretching. It can be derived that the elastic non-woven fabric with two layers of structure has higher requirements on the cohesive strength and peel strength of the hot melt adhesive, and also has higher requirements on the open time of the hot melt adhesive, otherwise, adhesion is prone to occur during rolling up process of the elastic non-woven fabric in the production.

SUMMARY

The technical problem to be solved by the present disclosure is to eliminate the drawbacks of poor softness, comfort degree and air permeability of the existing elastic non-woven fabric (elastic material) with three layers of structure, and to reduce the raw materials consumed in production and the cost. In view of the above, the present disclosure provides a soft elastic composite material.

In order to solve the above problems, the present disclosure proposes the following technical solutions. A super-soft elastic composite material includes a substrate layer having a pleated structure and an elastic layer, wherein the pleated structure consists of crest portions and trough portions connecting the crest portions. The crest portions and trough portions extend alternately along a longitudinal direction of the substrate layer. A plurality of elastic elements are arranged at intervals on the substrate layer along a breadthwise direction of the substrate layer, and two ends of each elastic element spread, in parallel, along the longitudinal direction of the substrate layer to form the elastic layer, and the elastic layer and the substrate layer are combined and bonded to form a unity through a hot melt adhesive layer. The super-soft elastic composite material is characterized in that the elastic composite material is constructed by combining two layers of structure, the hot melt adhesive layer is coated on a bonding surface of each elastic element facing the substrate layer first, and then the elastic elements are bonded to the trough portions through the hot melt adhesive layer, such that the elastic composite material is stretchable and recoverable in the longitudinal direction.

In some embodiments, the substrate layer is one material selected from the group consisting of spunbond non-woven fabrics, bi-component non-woven fabrics, hot air non-woven fabrics, spunlace non-woven fabrics, air-permeable film, cast film, polyester fabrics, polyamide fabrics, needle punched non-woven fabrics, and sanitary paper.

In a specific embodiment, the elastic elements are spandex filaments of 10-2000 Denier, the spandex filaments are made by melt extrusion, solution dry spinning, solution wet spinning, or reaction spinning method, and a distance between two adjacent spandex filaments is 0.5-6 mm. Specifically, a breadth of the elastic composite material may be selected in a range of 20-3200 mm, and spandex filaments with a quantity of 4-6401 may be arranged along the breadth of the elastic composite material. Meanwhile, a stretch ratio of the spandex filaments is 1.1-6.0, and all of the spandex filaments share the same stretch ratio.

According to the present disclosure, although currently available hot melt adhesive may be used to bond the structures, in order to address the problem that due to the loss of the anchorage for the spandex filaments on the other side provided by the non-woven fabric, when the elastic non-woven fabric with two layers of structure is in a stretched state, the creep resistant behaviour of the spandex filaments gets worse due to the lack of anchorage for the spandex filaments, and to avoid the problem of adhesion that happens during the rolling up process of the elastic non-woven fabric in the production, the present disclosure provides an elastic non-woven fabric with two layers of structure, in which a hot melt adhesive with higher cohesive strength and peel strength and shorter open time is used, so as to obtain an ultra-soft and creep-resistant elastic composite material. The elastic composite material has a creep rate less than 2.69%.

According to a specific technical solution, in the super-soft elastic composite material, the hot melt adhesive is a modified styrenic block copolymer based hot melt adhesive made of styrenic block copolymer based hot melt adhesive modified by maleic anhydride-grafted graphene oxide, so as to increase the cohesive strength and to reduce the open time of the modified styrenic block copolymer based hot melt adhesive.

Specifically, the modified styrenic block copolymer based hot melt adhesive is obtained according to the following solution: based on parts by weight, the modified styrenic block copolymer based hot melt adhesive consists of the following components: maleic anhydride grafted graphene oxide 2-10 parts, maleic anhydride grafted styrenic block copolymer 1-5 parts, styrenic block copolymer 35-45 parts, tackifying resin 30-50 parts, plasticizer 20-25 parts, antioxidant 0.1-0.8 parts; the grafted styrenic block copolymer is one material selected from a group consisting of SIS, SBS, SEBS, and a combination thereof; and the grafting rate of maleic anhydride grafted graphene oxide is 0.8-2.0%.

Wherein, the maleic anhydride grafted graphene oxide is prepared by the following method:
S1, placing graphene oxide in an aqueous solution for ultrasonic peeling and dispersion pretreatment, and obtaining graphene oxide filter residue through filtration;
S2, completely dissolving maleic anhydride in a DMF solvent to obtain a maleic anhydride-DMF solution;
S3, adding the graphene oxide filter residue into the maleic anhydride-DMF solution, reacting under a stirring condition at a temperature of 42° C.-45° C. for 8-10h, performing suction filtration after the reaction is completed, and separating to obtain the maleic anhydride grafted graphene oxide filter residue;
S4, fully washing and drying the maleic anhydride grafted graphene oxide filter residue to obtain maleic anhydride grafted graphene oxide.

According to another aspect of the present disclosure, a disposable absorbent article is provided, which includes an absorbent main body, and at least an end portion in a longitudinal direction of the absorbent main body is attached with an elastic waistband made of the aforementioned super-soft elastic composite material.

In some embodiments, the disposable absorbent article is a two-piece pull-up diaper, a three-piece pull-up diaper, a disposable underwear, or a diaper.

According to yet another aspect of the present disclosure, a medical bandaging article is provided, which includes a bandage, and the bandage is made of the aforementioned ultra-soft elastic composite material.

The present disclosure has the following advantages.

1. Compared with the elastic composite material with three layers of structure, the elastic composite material with two layers of structure of the present disclosure is softer and pleasantly tactile. Since the non-woven fabric is only used on one side rather both sides, the elastic composite material with two layers of structure has a better air permeability which improves the comfort degree of the material in use. In addition, the consumption of non-woven fabrics can be reduced and costs can be lowered.

2. Maleic anhydride-grafted graphene oxide is uniformly dispersed in the hot melt adhesive system, which can effectively enhance the cohesive strength and peel strength of the hot melt adhesive. With high cohesive strength, the anchorage for the spandex filaments can be effectively improved when the elastic non-woven fabric with two layers of structure is in stretched state, and the probability that the spandex filaments retract or creep under stretching can be reduced. Meanwhile, the graphene evenly dispersed in the system can reduce the open time of the hot melt adhesive through heat conduction, so that adhesion is unlikely to happen during the rolling up process in the production of the elastic non-woven fabric.

DETAILED DESCRIPTION OF THE EMBODIMENTS

In order to clarify the technical problems to be solved, technical solutions and advantages of the present disclosure, the present disclosure will be further described in detail below in conjunction with the embodiments. It should be understood that the specific embodiments described hereinafter are only intended to explain the present disclosure rather limit the scope of the present disclosure.

There is a technical prejudice in the pertinent field that the elastic composite material should have a three-layer composite structure, such as elastic non-woven fabric, which consists of an upper layer non-woven fabric, a lower layer non-woven fabric, and spandex filaments (elastic elements) arranged between the upper layer non-woven fabric and the lower layer non-woven fabric, and the three layers are combined through hot melt adhesive. Further, the upper layer non-woven fabric and the lower layer non-woven fabric both have folds and pleats extending along the longitudinal direction. Since the elastic non-woven fabric is combined by three layers of structure, the hot melt heat on the upper layer non-woven fabric and the lower layer non-woven fabric can effectively anchor or fix the spandex filaments (elastic elements), so as to avoid poor creep resistance of the spandex filaments due to insufficient anchorage of the spandex filaments when the existing elastic material is in stretched state, namely, the problem that the spandex filaments retract under stretching due to insufficient anchoring effect provided by the hot melt adhesive. However, since the existing elastic non-woven fabric (elastic material) constructed by three layers of structure is thick, so its softness, air permeability, and comfort degree are unsatisfactory. Therefore, to improve softness, air permeability and comfort degree of elastic non-woven fabrics, people keeping such prejudice in mind tends to take the following measures.

The first measure is to increase the height and width of the crests or troughs of the folds and pleats, so as to increase the ventilation channel as well as increase the contact area with the skin, thereby improving the air permeability and comfort degree of the elastic non-woven fabric.

The second measure is to use a softer non-woven fabric material as the upper layer non-woven fabric and the lower layer non-woven fabric in order to improve the softness of the elastic non-woven fabric. However, this measure can only achieve a very limit improvement on the softness of the elastic non-woven fabric.

Figure 1:
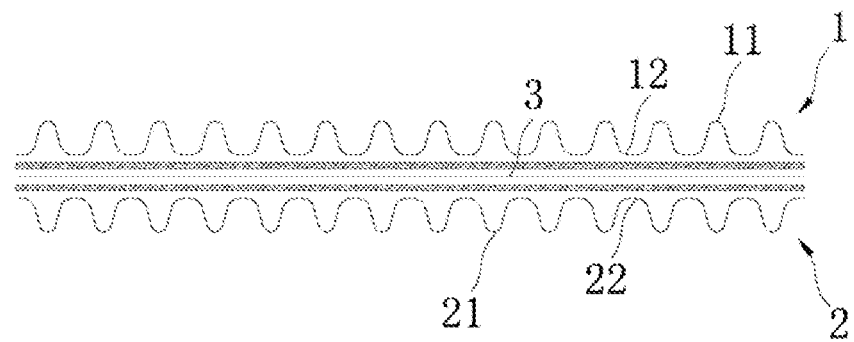
FIG. 1 is a structural schematic diagram showing an existing elastic composite non-woven fabric with three layers of structure.
Figure 2:
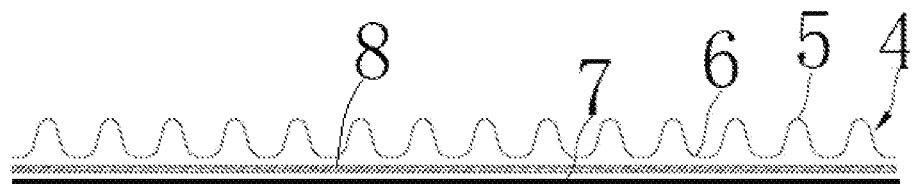
FIG. 2 is a structural schematic diagram showing an elastic composite material with two layers of structure according to the present disclosure.

In order to overcome the above-mentioned technical prejudice, with reference to FIG. 2, the present disclosure provides an elastic material or elastic non-woven fabric constructed by combining two layers of structure. Compared with the existing elastic non-woven fabric with three layers of structure, materials (i.e. non-woven fabric or other materials) are no longer applied on one of the two sides, which imparts excellent softness for the double-layered elastic non-woven fabric. The specific implementation of the double-layered elastic non-woven fabric is described below.

A super-soft elastic composite material includes a substrate layer 4 having a pleated structure and an elastic layer, wherein the pleated structure consists of crest portions 5 and trough portions 6 connecting the crest portions 5. The crest portions 5 and trough portions 6 extend alternately along a longitudinal direction of the substrate layer 4. A plurality of elastic elements 7 are arranged at intervals on the substrate layer 4 along a breadthwise direction of the substrate layer 4, and two ends of each elastic element 7 spread, in parallel, along the longitudinal direction of the substrate layer 4 to form the elastic layer, and the elastic layer and the substrate layer 4 are combined and bonded to form a unity through a hot melt adhesive layer 8. The super-soft elastic composite material is characterized in that the elastic composite material is constructed by combining two layers of structure, the hot melt adhesive layer 8 is coated on a bonding surface of each elastic element 7 facing the substrate layer 4 first, and then the elastic elements 7 are bonded to the trough portions 6 through the hot melt adhesive layer 8, such that the elastic composite material is stretchable and recoverable in the longitudinal direction.

In a specific embodiment, the substrate layer 4 may be spunbond non-woven fabrics, bi-component non-woven fabrics, hot air non-woven fabrics, spunlace non-woven fabrics, air-permeable film, cast film, polyester fabrics, polyamide fabrics, needle punched non-woven fabrics, or sanitary paper. Preferably, the substrate layer 4 may be spunbond non-woven fabrics, bi-component non-woven fabrics, hot air non-woven fabrics, or spunlace non-woven fabrics. In some embodiments, preferably, an inner side of the substrate layer facing the user may be provided with sanitary paper which has water absorption ability and can absorb sweat or other body fluids in use.

In a specific embodiment, the elastic elements are spandex filaments of 10-2000 Denier, the spandex filaments may be made by melt extrusion, solution dry spinning, solution wet spinning, or reaction spinning method. Specifically, a distance between two adjacent spandex filaments is 0.5-6 mm. A breadth of the elastic composite material may be selected in a range of 20-3200 mm, and spandex filaments with a quantity of 4-6401 may be arranged along the breadth of the elastic composite material.

In a specific implementation, a stretch ratio of the spandex filaments is 1.1-6.0, and all of the spandex filaments share the same stretch ratio.

In a specific embodiment, the adhesive application process for the spandex filaments may be a scrapping process, a spiral spraying process, or other adhesive application processes, and the amount of adhesive to be applied is familiar to those skilled in the art.

Although the elastic material or elastic non-woven fabric constructed by combining two layers of structure according to the present disclosure may also use the existing hot melt adhesive as the structure bonding adhesive, the existing hot melt adhesive is prone to cause retraction and creep of the elastic material under stretching due the insufficient cohesive strength of the existing hot melt adhesive. Meanwhile, long open time of the existing hot melt adhesive can also lead to adhesion of the elastic material when it is rolled up. It can be observed that the key to obtain super-soft and creep-resistant elastic non-woven fabrics in the present disclosure lies in the selection of hot melt adhesive with higher cohesive strength, peel strength, and shorter open time.

The hot melt adhesive is made according to the following implementations: the hot melt adhesive is a modified styrenic block copolymer based hot melt adhesive made of styrenic block copolymer based hot melt adhesive modified by maleic anhydride-grafted graphene oxide, so as to increase the cohesive strength and to reduce the open time of the modified styrenic block copolymer based hot melt adhesive.

Specifically, one specific implementation of the hot melt adhesive is as follows: based on parts by weight, the modified styrenic block copolymer based hot melt adhesive consists of the following components: maleic anhydride grafted graphene oxide 2-10 parts, maleic anhydride grafted styrenic block copolymer 1-5 parts, styrenic block copolymer 35-45 parts, tackifying resin 30-50 parts, plasticizer 20-25 parts, antioxidant 0.1-0.8 parts. The grafted styrenic block copolymer may be SIS, SBS, SEBS, or a combination thereof; and the grafting rate of maleic anhydride grafted graphene oxide is 0.8-2.5%.

Specifically, the maleic anhydride grafted styrenic block copolymer is an existing material that can be prepared according to known knowledge in the art or is commercially available. The tackifying resin, plasticizer, antioxidant are all conventional materials familiar to those skilled in the art. For example, the tackifying resin may be rosin resin, hydrogenated petroleum, or a combination thereof, and the plasticizer may be naphthenic oil, mineral oil or paraffin.

The maleic anhydride grafted graphene oxide of the present disclosure may be prepared by following method:

S1, placing graphene oxide in an aqueous solution for ultrasonic peeling and dispersion pretreatment, and obtaining graphene oxide filter residue through filtration;

S2, completely dissolving maleic anhydride in a DMF solvent to obtain a maleic anhydride-DMF solution;

S3, adding the graphene oxide filter residue into the maleic anhydride-DMF solution, reacting under a stirring condition at a temperature of 42° C.-45° C. for 8-10h, performing suction filtration after the reaction is completed, and separating to obtain the maleic anhydride grafted graphene oxide filter residue;

S4, fully washing and drying the maleic anhydride grafted graphene oxide filter residue to obtain maleic anhydride grafted graphene oxide.

Afterwards, according to the existing method of preparing hot melt adhesive in pertinent field, put the styrenic block copolymer, tackifying resin, and plasticizer into a reaction container to preliminarily prepare styrenic block copolymer based hot melt adhesive, then add maleic anhydride grafted graphene oxide, maleic anhydride grafted styrenic block copolymer and antioxidant into the reaction container and stir the materials until they are uniformly dispersed, react for a certain period of time, and finally discharge and cool the product to obtain the modified styrenic block copolymer based hot melt adhesive.

The super-soft elastic composite material obtained by the above exemplary embodiments can be applied to various absorbent articles or disposable absorbent articles (for example, baby diapers, adult diapers, disposable underwear, pull-up diapers, pads, liners, etc.), as one or more components of the absorbent article. The components of the absorbent article may include, but not limited to, elastic waistband, side sheet, top sheet, back sheet, ears or closure elements, leg cuff or leak guard, and the so on. The super-soft elastic composite material of the present disclosure may also be applied to various hygiene products, adult incontinence products, menstrual products, medical and health products (for example, various protective products, including but not limited to masks, protective clothing, or medical bandages, including but not limited to bandages, etc.) and other fields. The above-mentioned application fields are not exhaustive, and those skilled in the art can also apply the super-soft elastic composite material to other similar or related fields in consideration of specific use requirements, and these applications not departing from the contents of the present disclosure should be considered as falling within the scope of protection of the present disclosure.

Figure 3:
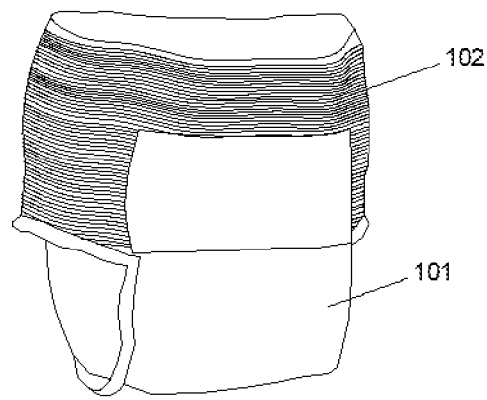
FIG. 3 is a structural diagram schematically showing a disposable absorbent article according to the present disclosure.

As shown in FIG. 3, the present disclosure also provides a disposable absorbent article, which includes an absorbent main body 101, and at least an end portion in a longitudinal direction of the absorbent main body 101 is attached with an elastic waistband 102 made of the aforementioned super-soft elastic composite material.

In some embodiments, the disposable absorbent article may be a two-piece pull-up diaper, a three-piece pull-up diaper, a disposable underwear, or a diaper.

In some exemplary embodiments, the absorbent main body includes, from top to bottom, a liquid-permeable top sheet, an absorbent core, and a liquid-impermeable back sheet. Alternatively, the structure of the absorbent main body may be the main structure of a general absorbent product known to those skilled in the art, which is not of essence to the present disclosure and will not be described in detail here.

Figure 4:
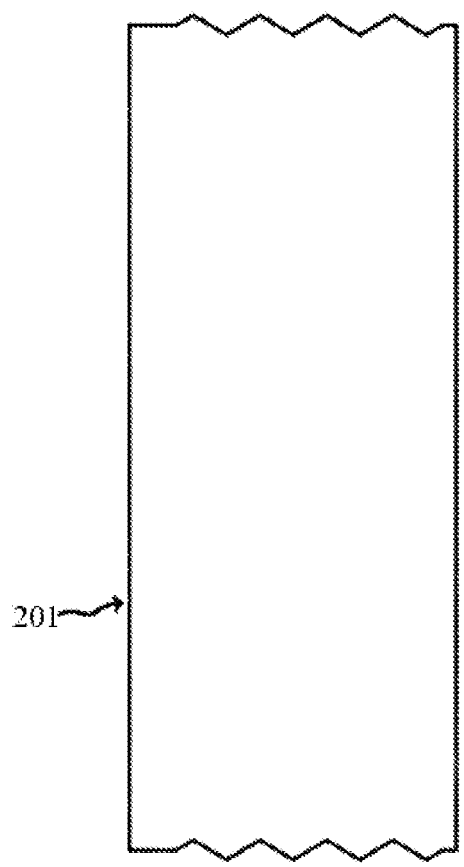
FIG. 4 is a structural diagram schematically showing a medical bandaging article according to the present disclosure.

As shown in FIG. 4, the present disclosure also provides a medical bandaging article, which includes a bandage 201 made of the aforementioned ultra-soft elastic composite material.

Embodiment 1

Based on parts by weight, the modified styrenic block copolymer based hot melt adhesive according to the present embodiment consists of the following components: 2 parts of maleic anhydride grafted graphene oxide, 1 part of maleic anhydride grafted SIS (styrene and 2-methyl-1,3-butadiene), 35 parts of SIS, 30 parts of tackifying resin, 20 parts of plasticizer, and 0.2 parts of antioxidant, and the grafting rate of maleic anhydride grafted graphene oxide is 0.91%.

Embodiment 2

Based on parts by weight, the modified styrenic block copolymer based hot melt adhesive according to the present embodiment consists of the following components: 6 parts of maleic anhydride grafted graphene oxide, 3 parts of maleic anhydride grafted SBS (ionic copolymerization of styrene and butadiene), 40 parts of SBS, 40 parts of tackifying resin, 22 parts of plasticizer, 0.3 parts of antioxidant, and the grafting rate of maleic anhydride grafted graphene oxide is 1.20%.

Embodiment 3

Based on parts by weight, the modified styrenic block copolymer based hot melt adhesive according to the present embodiment consists of the following components: 10 parts of maleic anhydride grafted graphene oxide, 5 parts of maleic anhydride grafted SEBS (styrene-ethylene-butylene-styrene), 45 parts of SEBS, 50 parts of tackifying resin, 25 parts of plasticizer, 0.4 parts of antioxidant, and the grafting rate of maleic anhydride grafted graphene oxide is 2.0%.

Performance Testing:

Test sample 1: with the same processes, adhesive application process, and adhesive application amount, spunbonded non-woven fabric with grams per square meter of 26 (g/m$^2$) is used as the upper layer non-woven fabric and the lower layer non-woven fabric of the elastic non-woven fabric respectively, spandex filaments of 160 Denier are used as the elastic elements, the distance between two adjacent spandex filaments is 4 mm, and the stretch ratio of the spandex filaments is 1.4. Using the existing hot melt adhesive and adhesive scrapping process to respectively make a piece of elastic non-woven fabric with three layers of structure (comparison sample) and a piece of elastic non-woven fabric with two layers of structure (test sample), and these two samples are used as comparison samples for creep resistance test.

Test sample 2: The hot melt adhesives prepared according to embodiments 1-3 are respectively used to prepare elastic non-woven fabrics with two layers of structure, and other processes and parameters are the same as that of test sample 1. Each sample is tested three times, and the average value is taken as the test result.

Testing Method:

Softness test: refer to GB/T 8942-2016 "Paper Determination of Softness".

Creep resistance performance test: prepare a test cardboard, fully stretch the test samples and the comparison samples and fix the samples on the cardboard with staples or the like, then pick 25 cm of each spandex filament as a test section, and mark two ends of the test section with a marker pen. Afterwards, place the above-mentioned samples in a constant temperature oven at 40° C. for 12 hours, then take out the samples and measure the length of the test section of each spandex filament after creep or retraction. The creep rate is calculated as follows: creep rate (%)=(25−L1)/25*100%, where L1 is the length of the test section of the spandex filament after retraction.

Adhesion during rolling up: this test item is mainly judged intuitively by personnel who checks the rolls of fabrics.

Test Results:

TABLE 1

Softness of elastic non-woven fabric

| Sample | Testing sample | | Comparative sample | |
|---|---|---|---|---|
| | MD (vertical) | TD (lateral) | MD (vertical) | TD (lateral) |
| Softness (mN · cm) | 82.9 | 126.1 | 132.5 | 156.3 |

The above data of the test result shows that the elastic composite material with two layers of structure is softer and pleasantly tactile than the elastic composite material with three layers of structure. Since the non-woven fabric is only used on one side of the elastic elements, the elastic composite material with two layers of structure has better air permeability, thereby improving the comfort degree of the elastic non-woven fabrics in use. In addition, the elastic composite material with two layers of structure can also reduce consumption of the non-woven fabrics and reduce cost.

TABLE 2

Creep resistance of elastic non-woven fabrics

| Sample | Embodiment 1 | Embodiment 2 | Embodiment 3 | Comparative sample |
|---|---|---|---|---|
| Data 1 (%) | 2.75 | 2.33 | 1.78 | 6.42 |
| Data 2 (%) | 2.80 | 2.54 | 2.05 | 4.87 |
| Data 3 (%) | 2.51 | 2.41 | 1.54 | 7.57 |
| Mean (%) | 2.69 | 2.42 | 1.79 | 6.27 |
| Adhesion during rolling up | no | no | no | yes |

The above data of the test result shows that the maleic anhydride grafted graphene oxide is uniformly dispersed in the hot melt adhesive system, which can effectively enhance the cohesive strength and peel strength of the hot melt adhesive. With improved cohesive strength, anchorage for the spandex filaments can be effectively improved when the elastic non-woven fabric with two layers of structure is in a stretched state, and reduce the probability that the spandex filaments retract or creep under stretching. Meanwhile, the graphene evenly dispersed in the system can reduce the open time of the hot melt adhesive through heat conduction, so as to avoid adhesion during rolling up process of the elastic non-woven fabric in production.

The foregoing description shows and describes preferred embodiments of the present disclosure, and as previously stated, it is to be understood that the present disclosure is not limited to the form disclosed herein and should not be construed as excluding other embodiments, but may be applied to various other embodiments. combinations, modifications and settings, and can be modified within the scope of the inventive concept described herein based on the above teachings or skills or knowledge of the relevant field. Modifications and changes made by those skilled in the art without departing from the spirit and scope of the present disclosure should be considered as falling within the scope of protection of the appended claims of the present disclosure.

What is claimed is:

1. A super-soft and creep-resistant elastic composite material, comprising a substrate layer having a pleated structure and an elastic layer,
   wherein the pleated structure consists of crest portions and trough portions connecting the crest portions, the crest portions and trough portions extend alternately along a longitudinal direction of the substrate layer, a plurality of elastic elements are arranged at intervals on the substrate layer along a breadthwise direction of the substrate layer, and two ends of each elastic element spread, in parallel, along the longitudinal direction of the substrate layer to form the elastic layer, and the elastic layer and the substrate layer are combined and bonded to form a unity through a hot melt adhesive layer; and
   the elastic composite material is constructed by combining two layers of structure, the hot melt adhesive layer is coated on a bonding surface of each elastic element facing the substrate layer first, and then the elastic elements are bonded to the trough portions through the hot melt adhesive layer, such that the elastic composite material is stretchable and recoverable in the longitudinal direction;
   the hot melt adhesive is a modified styrenic block copolymer based hot melt adhesive made of styrenic block copolymer based hot melt adhesive modified by maleic anhydride-grafted graphene oxide, so as to increase the cohesive strength and to reduce the open time of the modified styrenic block copolymer based hot melt adhesive.

2. The super-soft and creep-resistant elastic composite material according to claim 1, wherein the substrate layer is one material selected from the group consisting of spunbond non-woven fabrics, bi-component non-woven fabrics, hot air non-woven fabrics, spunlace non-woven fabrics, air-permeable film, cast film, polyester fabrics, polyamide fabrics, needle punched non-woven fabrics, and sanitary paper.

3. The super-soft and creep-resistant elastic composite material according to claim 1, wherein the elastic elements are spandex filaments of 10-2000 Denier, and a distance between two adjacent spandex filaments is 0.5-6 mm.

4. The super-soft and creep-resistant elastic composite material according to claim 3, wherein a stretch ratio of the spandex filaments is 1.1-6.0, and all of the spandex filaments share the same stretch ratio.

5. The super-soft and creep-resistant elastic composite material according to claim 3, wherein the spandex filaments are made by melt extrusion, solution dry spinning, solution wet spinning, or reaction spinning method.

6. The super-soft and creep-resistant elastic composite material according to claim 1, wherein based on parts by weight, the modified styrenic block copolymer based hot melt adhesive consists of the following components:
   maleic anhydride grafted graphene oxide 2-10 parts, maleic anhydride grafted styrenic block copolymer 1-5 parts, styrenic block copolymer 35-45 parts, tackifying resin 30-50 parts, plasticizer 20-25 parts, antioxidant 0.1-0.8 parts;
   the maleic anhydride grafted styrenic block copolymer is one material selected from a group consisting of SIS, SBS, SEBS, and a combination thereof; and
   a grafting rate of the maleic anhydride grafted graphene oxide is 0.8-2.0%.

7. The super-soft and creep-resistant elastic composite material according to claim 6, wherein the maleic anhydride grafted graphene oxide is prepared by the following method:
   S1, placing graphene oxide in an aqueous solution for ultrasonic peeling and dispersion pretreatment, and obtaining graphene oxide filter residue through filtration;
   S2, completely dissolving maleic anhydride in a DMF solvent to obtain a maleic anhydride-DMF solution;
   S3, adding the graphene oxide filter residue into the maleic anhydride-DMF solution, reacting under a stirring condition at a temperature of 42° C.-45° C. for 8-10h, performing suction filtration after the reaction is completed, and separating to obtain the maleic anhydride grafted graphene oxide filter residue; and
   S4, fully washing and drying the maleic anhydride grafted graphene oxide filter residue to obtain maleic anhydride grafted graphene oxide.

8. The super-soft and creep-resistant elastic composite material according to claim 7, wherein the elastic composite material has a creep rate less than 2.69%.

9. A disposable absorbent article, comprising an absorbent main body, wherein at least an end portion in a longitudinal direction of the absorbent main body is attached with an elastic waistband made of a super-soft and creep-resistant elastic composite material comprising a substrate layer having a pleated structure and an elastic layer,
   wherein the pleated structure consists of crest portions and trough portions connecting the crest portions, the crest portions and trough portions extend alternately along a longitudinal direction of the substrate layer, a plurality of elastic elements are arranged at intervals on the substrate layer along a breadthwise direction of the substrate layer, and two ends of each elastic element spread, in parallel, along the longitudinal direction of the substrate layer to form the elastic layer, and the elastic layer and the substrate layer are combined and bonded to form a unity through a hot melt adhesive layer; and
   the elastic composite material is constructed by combining two layers of structure, the hot melt adhesive layer is coated on a bonding surface of each elastic element facing the substrate layer first, and then the elastic elements are bonded to the trough portions through the hot melt adhesive layer, such that the elastic composite material is stretchable and recoverable in the longitudinal direction;
   the hot melt adhesive is a modified styrenic block copolymer based hot melt adhesive made of styrenic block copolymer based hot melt adhesive modified by maleic anhydride-grafted graphene oxide, so as to increase the cohesive strength and to reduce the open time of the modified styrenic block copolymer based hot melt adhesive.

10. The disposable absorbent article according to claim 9, wherein the disposable absorbent article is a two-piece pull-up diaper, a three-piece pull-up diaper, a disposable underwear, or a diaper.

11. A medical bandaging article, comprising a bandage, wherein the bandage is made of a super-soft and creep-resistant elastic composite material comprising a substrate layer having a pleated structure and an elastic layer,
   wherein the pleated structure consists of crest portions and trough portions connecting the crest portions, the crest portions and trough portions extend alternately along a longitudinal direction of the substrate layer, a plurality of elastic elements are arranged at intervals on the substrate layer along a breadthwise direction of the substrate layer, and two ends of each elastic element spread, in parallel, along the longitudinal direction of the substrate layer to form the elastic layer, and the elastic layer and the substrate layer are combined and bonded to form a unity through a hot melt adhesive layer; and
   the elastic composite material is constructed by combining two layers of structure, the hot melt adhesive layer is coated on a bonding surface of each elastic element facing the substrate layer first, and then the elastic elements are bonded to the trough portions through the hot melt adhesive layer, such that the elastic composite material is stretchable and recoverable in the longitudinal direction;
   the hot melt adhesive is a modified styrenic block copolymer based hot melt adhesive made of styrenic block copolymer based hot melt adhesive modified by maleic anhydride-grafted graphene oxide, so as to increase the cohesive strength and to reduce the open time of the modified styrenic block copolymer based hot melt adhesive.

* * * * *